United States Patent
Bruck

(10) Patent No.: US 9,079,519 B2
(45) Date of Patent: Jul. 14, 2015

(54) ASSEMBLY AND METHOD FOR COMPRESSIVE SWAGING SIDE FRAMES TO A PACKAGE SUPPORTING HOUSING ASSOCIATED WITH A FORWARD DUMP VEHICLE HEADREST

(71) Applicant: BAE Industries, Inc., Warren, MI (US)

(72) Inventor: Stephen C. Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 279 days.

(21) Appl. No.: 13/829,910

(22) Filed: Mar. 14, 2013

(65) Prior Publication Data

US 2013/0318768 A1 Dec. 5, 2013

Related U.S. Application Data

(60) Provisional application No. 61/653,824, filed on May 31, 2012.

(51) Int. Cl.

| B23P 11/00 | (2006.01) |
| B21D 31/00 | (2006.01) |
| B21D 39/00 | (2006.01) |
| B60N 2/48 | (2006.01) |
| B60N 2/68 | (2006.01) |

(52) U.S. Cl.
CPC .............. *B60N 2/48* (2013.01); *B60N 2/4855* (2013.01); *B60N 2/682* (2013.01); *Y10T 29/49915* (2015.01); *Y10T 29/49922* (2015.01); *Y10T 29/53709* (2015.01)

(58) Field of Classification Search
CPC ................... Y10T 29/49922; Y10T 29/49915; Y10T 29/49934; Y10T 29/53709; B21D 22/06; B21D 39/026; B21D 39/032; B21D 39/037; B60N 2/4855; B60N 2/48; B60N 2/682
USPC ........... 29/509, 513, 520, 243.5; 72/374, 401, 72/416
See application file for complete search history.

(56) References Cited

U.S. PATENT DOCUMENTS

| 3,552,086 | A | * | 1/1971 | Allen .......................... 52/783.18 |
| 4,679,850 | A | | 7/1987 | Bianchi et al. |
| 6,035,516 | A | | 3/2000 | Petersen |
| 6,662,422 | B2 | | 12/2003 | Pradhan |

(Continued)

FOREIGN PATENT DOCUMENTS

FR 2888175 A1 1/2007

*Primary Examiner* — Essama Omgba
(74) *Attorney, Agent, or Firm* — Gifford, Krass, Sprinkle, Anderson & Citkowski, P.C.; Douglas J. McEvoy

(57) ABSTRACT

A jig assembly and corresponding method for swage assembling a workpiece having first and second side components and a central component. A first pair of bi-directional traversable platforms are supported in inward and outward reciprocating fashion relative to a central support fixture, and upon which are mounted supporting structures for mounting the workpiece. A pair of engaging jigs are mounted to inner opposing sides of the pair of traversable platforms. Each of the engaging jigs includes a plurality of fingers which are adapted to seat within aperture locations associated with the workpiece side components and to facilitate loading and positioning the workpiece prior to swaging. A pair of opposing and synchronized inward compressing dies simultaneously swage locations associated with opposite edges of the central component which project through apertures defined in the side components.

5 Claims, 9 Drawing Sheets

(56) References Cited

U.S. PATENT DOCUMENTS

| | | |
|---|---|---|
| 6,823,575 B2 * | 11/2004 | Petersen .................. 29/509 |
| 7,331,634 B2 | 2/2008 | Petersen |
| 7,975,374 B2 * | 7/2011 | Williams .................. 29/788 |
| 2002/0121015 A1 | 9/2002 | Petersen |
| 2002/0157235 A1 | 10/2002 | Napolitano et al. |
| 2003/0029020 A1 | 2/2003 | Pradhan |
| 2005/0035641 A1 * | 2/2005 | Petersen .................. 297/396 |
| 2011/0030438 A1 | 2/2011 | Maier et al. |

* cited by examiner

ASSEMBLY AND METHOD FOR COMPRESSIVE SWAGING SIDE FRAMES TO A PACKAGE SUPPORTING HOUSING ASSOCIATED WITH A FORWARD DUMP VEHICLE HEADREST

CROSS-REFERENCE TO RELATED APPLICATIONS

This Application claims the benefit of U.S. Provisional Application 61/653,824 filed on May 31, 2012, the contents of which are incorporated herein in its entirety.

FIELD OF THE INVENTION

The present invention is directed to a type of jig actuated assembly and method for assembling the frame and housing components associated with a foldable vehicle headrest. More specifically, the present invention discloses a method and assembly utilizing an actuating jig assembly including opposing and inwardly compressive punch dies for compressive swaging of projecting edge portions associated with each of first and second opposite ends of a "U" shaped and package supporting housing which project through aligning slots formed in side positioned frames in a manner which bends or notches the projecting portions in firmly engaging fashion with the associated side of the "U" shaped housing.

BACKGROUND OF THE INVENTION

Various types aiming assemblies are known, such as for use in attaching a headrest support into an automobile seat frame. A first example of this is depicted in each of U.S. Pat. No. 6,035,516 and U.S. Pat. No. 7,331,634, both to Petersen, in which the headrest support tubes are secured to the seat frame member by gripping the web of the frame member between two rings or lock-beads swaged into the metal of the tube. The first ring is swaged-out by compressing the tube. The tube, with the one ring, is then assembled into a through-hole in the web of the frame member. The second ring is then swaged into the metal of the tube on the other side of the web and such that the web lies gripped between the rings.

U.S. Pat. No. 4,679,850, to Bianchi et al., teaches a device for fixing a headrest on a vehicle seat structure, and in which two diametrically opposed orifices are provided in the framework tube of the backrest of the seat structure and receive the headrest support bar which extends therethrough. A locking lug projecting inside the tube extends into a notch in the bar in order to immobilize the bar. The lug is carried internally by a collar which partly covers the tube and extends round the upper orifice receiving the bar. A guide socket is fitted into an opening of the collar coaxially with the upper orifice.

Finally, U.S. Pat. No. 6,662,422, issued to Pradham, teaches a method for connecting a headrest guide tube in a vehicle seat frame which includes the steps of forming a hole in the seat frame, inserting a headrest guide tube into the hole, axially compressing the tube to form a pair of rings on opposite sides of the frame wall, and then axially crushing the rings to form a pair of beads tightly clamping the headrest guide tube to the seat frame. During the crushing process, a portion of the headrest guide tube is bulged into a notch in the hole in the seat frame to prevent the guide tube from rotating with respect to the seat frame.

SUMMARY OF THE INVENTION

The present invention discloses a jig assembly for swage assembling a workpiece having first and second side components and a central component. The assembly includes a first pair of bi-directional traversable platforms supported in inward and outward reciprocating fashion relative to a central support fixture, and upon which are mounted supporting structures for mounting the workpiece.

A pair of engaging jigs are mounted to inner opposing sides of the pair of traversable platforms. Each of the engaging jigs includes a plurality of fingers which are adapted to seat within aperture locations associated with the workpiece side components and to facilitate loading and positioning the workpiece prior to swaging.

A pair of opposing and synchronized inward compressing dies simultaneously swage locations associated with opposite edges of the central component which project through apertures defined in the side components. Each of the dies includes an end face, with the dies being subsequently retracted and the swaged workpiece removed. Additional features include each of the opposing dies exhibiting an end face upon which are exhibited an array of projections including upper angling/bending locations and a lower notching location.

A corresponding method for swage assembling a workpiece is provided utilizing the above described structure and including the steps of positioning the workpiece upon a central supporting jig fixture and so that locations associated with opposite edges of the central component project through apertures defined in the side components and inwardly traversing a pair of bi-directional platforms for gripping opposite sides of the workpiece. Additional steps include rearwardly displacing the central jig fixture and supported workpiece in alignment with a pair of inwardly facing and opposing dies, inwardly displacing the dies into compressive engagement with the projecting locations of the central component for simultaneously swaging to the side components, and retracting the dies and removing the swaged workpiece.

Additional steps include forwardly displacing the central jig fixture following workpiece removal prior to loading with a subsequent pre-swaged workpiece. Other steps include providing a pair of engaging jigs mounted to inner opposing sides of the pair of traversable platforms, each of said engaging jigs including a plurality of fingers adapted to seat within aperture locations associated with the workpiece side components and to facilitate loading and positioning the workpiece prior to swaging. The step of inwardly displacing the dies into compressive engagement can also include angling/bending upper locations and inwardly notching a lower location of each die.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously indicated, the present invention is directed to a method and assembly utilizing an actuating jig assembly including opposing and inwardly compressive punch dies for compressive swaging of projecting edge portions associated with each of first and second opposite ends of a "U" shaped and package supporting housing which project through aligning slots formed in side positioned frames. As will be described, the opposing compressing action of the dies operates in a manner which bends or notches the projecting portions in firmly engaging fashion with the associated side of the "U" shaped housing.

Figure 1:
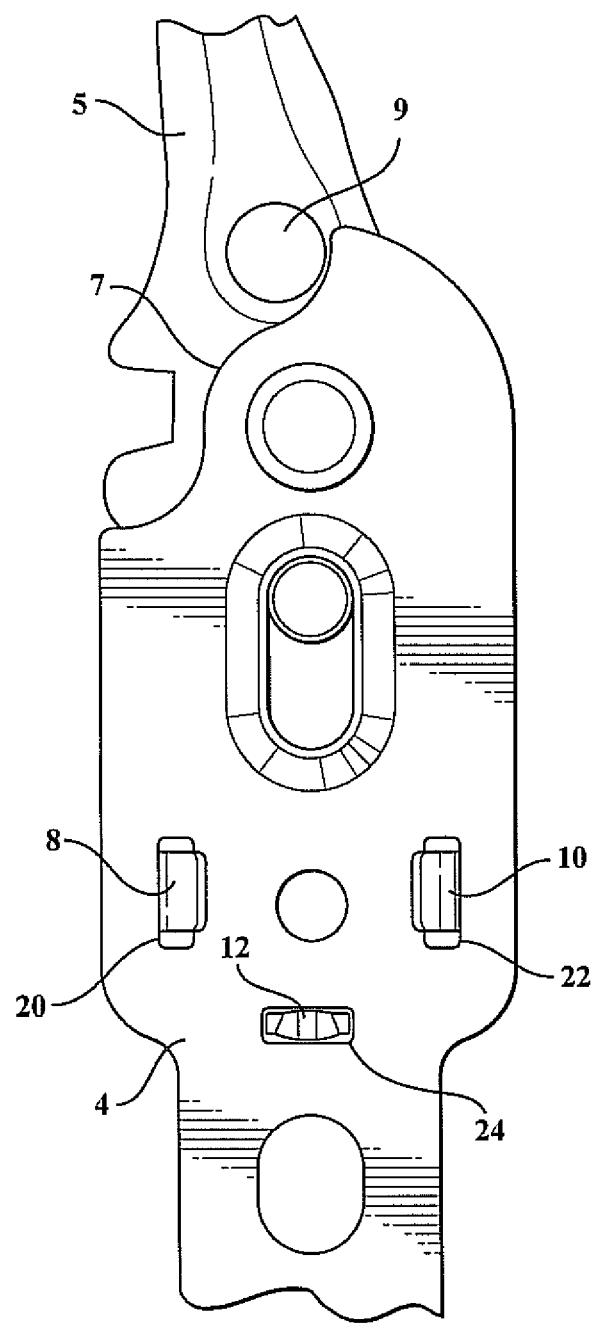
FIG. 1 is a side view of a foldable headrest assembly in which a plurality of projecting portions associated with the housing are swaged once seated through aligning apertures in a selected side support frame.
Figure 2:
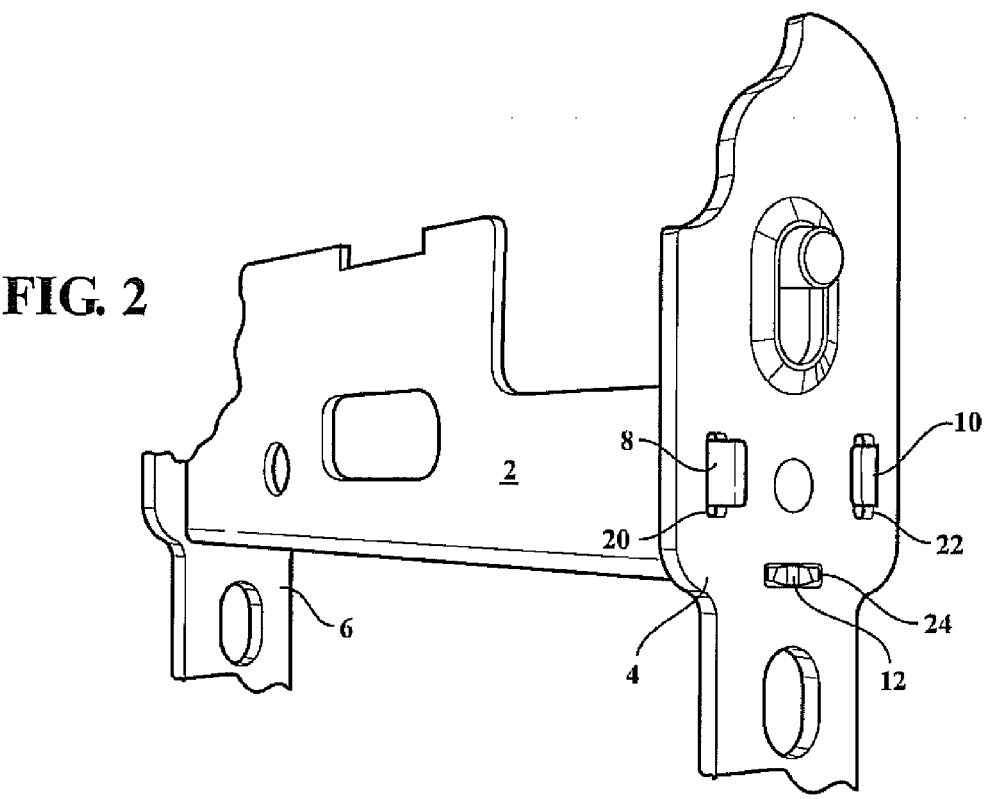
FIG. 2 is a rotated perspective of the assembly depicted in FIG. 1 and better illustrating the headrest assembly including swaged projecting portions associated with a first selected side support frame.
Figure 3:
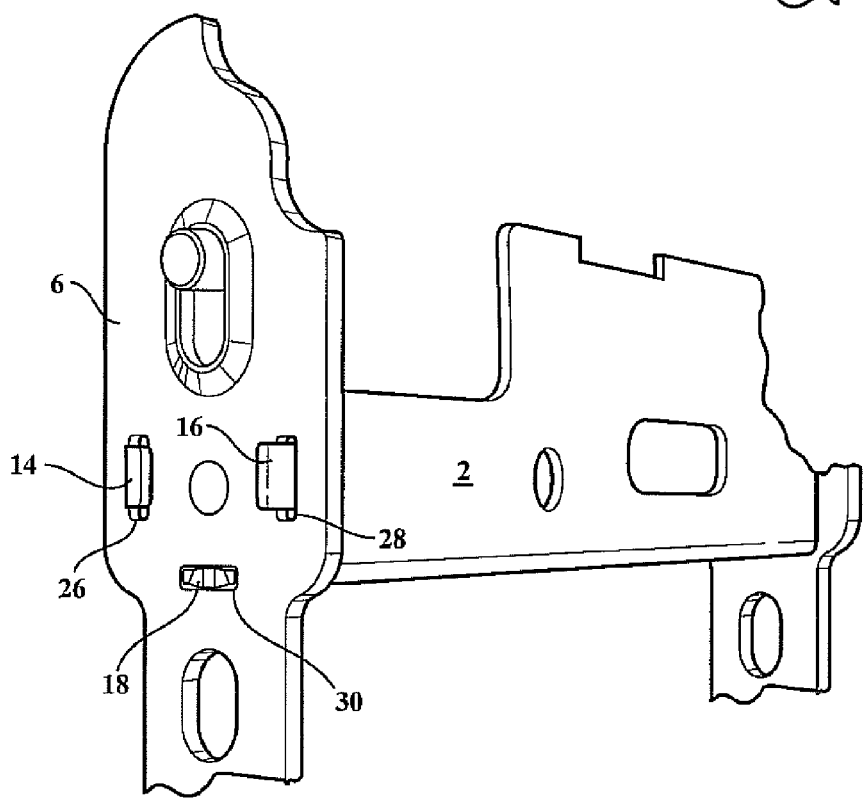
FIG. 3 is a rotated perspective similar to FIG. 2 of an opposite side support frame mounted to the housing via an identical configuration of swaged projecting portions.

Referring initially to FIGS. 1-3 a succession of side and first/second rotated perspective views are depicted of a foldable headrest assembly including a central and substantially "U" shaped support frame 2 (also termed a central component) and first 4 and second 6 opposite positioned and engaging side frames (also termed first and second side components). The lower "U" shaped edge profile of the package supporting housing 2 exhibits, along each opposite side edge, individual pluralities of edge projecting portions (as depicted at 8, 10 and 12 in FIGS. 1 and 2 and further at 14, 16, and 18 in FIG. 3).

The package defining housing 2 and side frame plates or supports 4 and 6 are typically constructed of a suitable grade metal/steel however can, without limitation, include other materials exhibiting the necessary properties of strength, durability and impact resistance. It is also understood that the jig assembly and method can be equally applicable to swage forming other structurally constructed assemblies, not limited to that shown, and which can again include alternate material constructions.

A headrest rod 5 (see FIG. 1) is typically provided as a "U" shaped and headrest bun supporting element and is in turn supported at opposite ends to the side frames 4 and 6 in rotatably displaceable fashion along a range defined by an upper edge configured and arcuate channel 7 (see for selected side frame plate or support 4 in FIG. 1) which guides a side configured pin 9 projecting laterally from a selected side location of the "U" shaped rod 5. Without further elaboration, FIGS. 1-3 depict a collection and arrangement of components associated the foldable headrest which define one known application and which are, by themselves, outside of the scope of the invention.

Figure 11:
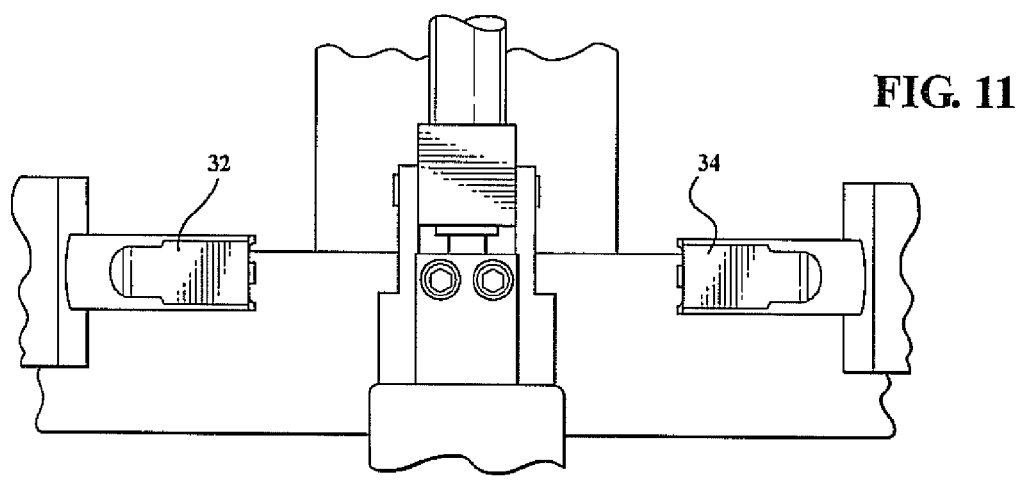
FIGS. 11 and 12 are top and side perspectives of the pair of opposing dies integrated into the die assembly.
Figure 13:
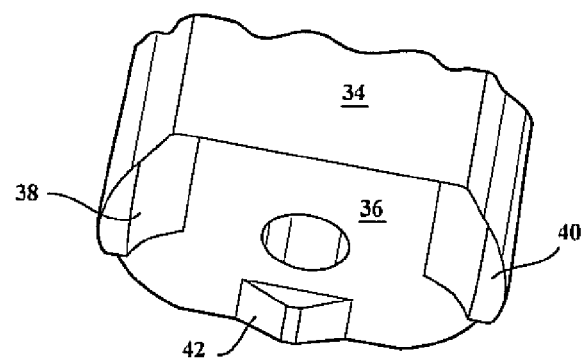
FIG. 13 is an enlarged partial perspective of the engaging pattern defined on the end face of a selected one of the opposing pair of inwardly deforming dies.
Figure 12:
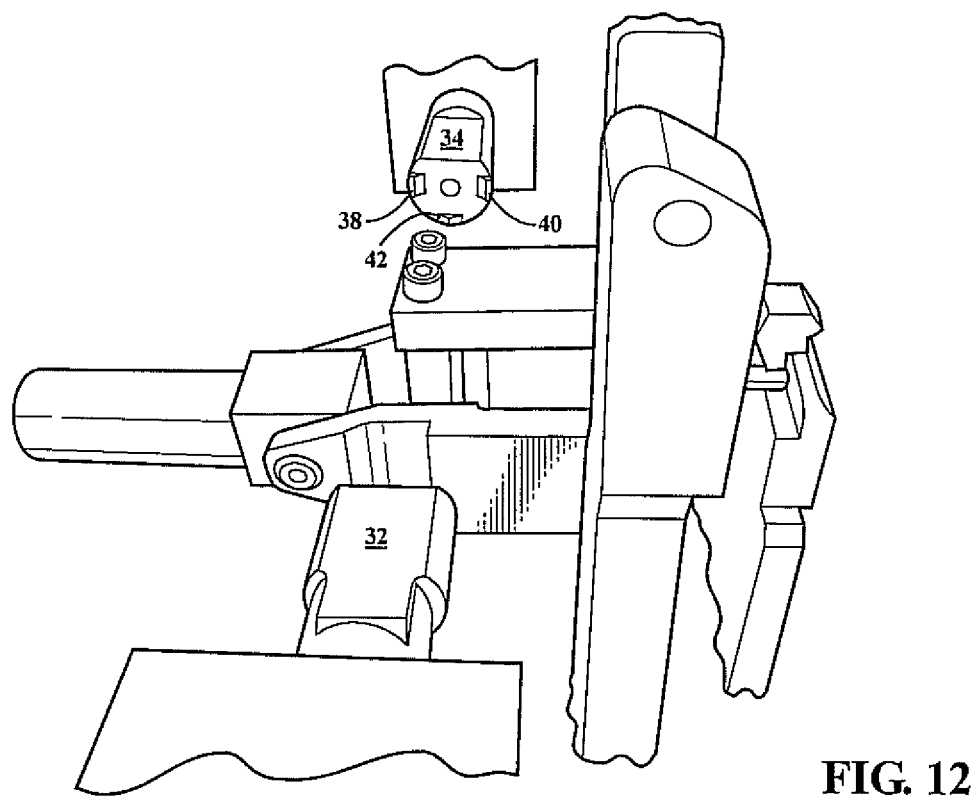

The extending pluralities of projecting portions 8-12 and 14-18 associated with the housing 2 are swaged (or bent) once seated through aligning apertures defined in each (such as during an initial stamping construction) of the side support frames and as further exhibited in FIGS. 1 and 2 by aperture pattern 20, 22 and 24 formed in frame support 4 in alignment with projection portions 8-12, as well as in FIG. 3 by like aperture pattern 26, 28 and 30 formed in frame support 6 in alignment with projecting portions 14-18. FIG. 13 depicts an enlarged partial perspective of the engaging pattern defined on the end face of a selected one of the opposing pair of inwardly deforming dies (see also pair of inwardly opposing dies 32 and 34 in FIGS. 11-12 and respective servo actuators 33 and 35 for driving the dies in first and second opposite directions and for exerting the necessary compressive forces for effectively swage assembling the headrest components As best depicted in the enlarged perspective of selected die 34 in FIG. 13, end face 36 of the die 34 exhibits an array of projections including upper angling/bending locations 38 and 40 and lower notching portion 42 (see also FIG. 12). As will be described in reference to the jig and die assembly of FIG. 4 et seq., the opposing and synchronized inward compressing of the dies 32 and 34 operate in a coordinated fashion in order to simultaneously swage each of the side frames 4 and 6 to the center and package defining housing 2 in the fashion depicted in FIGS. 1-3.

Figure 4:
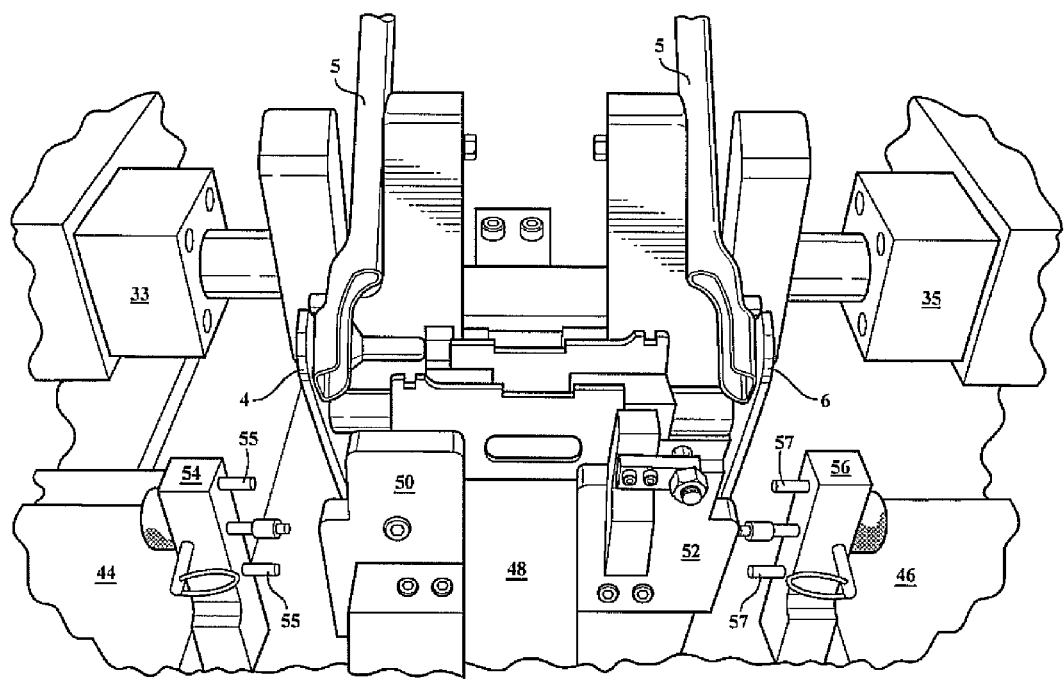
FIGS. 4-6 are a succession of front and first/second rotated side perspectives of a jig and die assembly supporting a headrest housing and side support frames during a swaging operation in which opposite side projecting portions of the housing are secured to each of the support frames.
Figure 5:
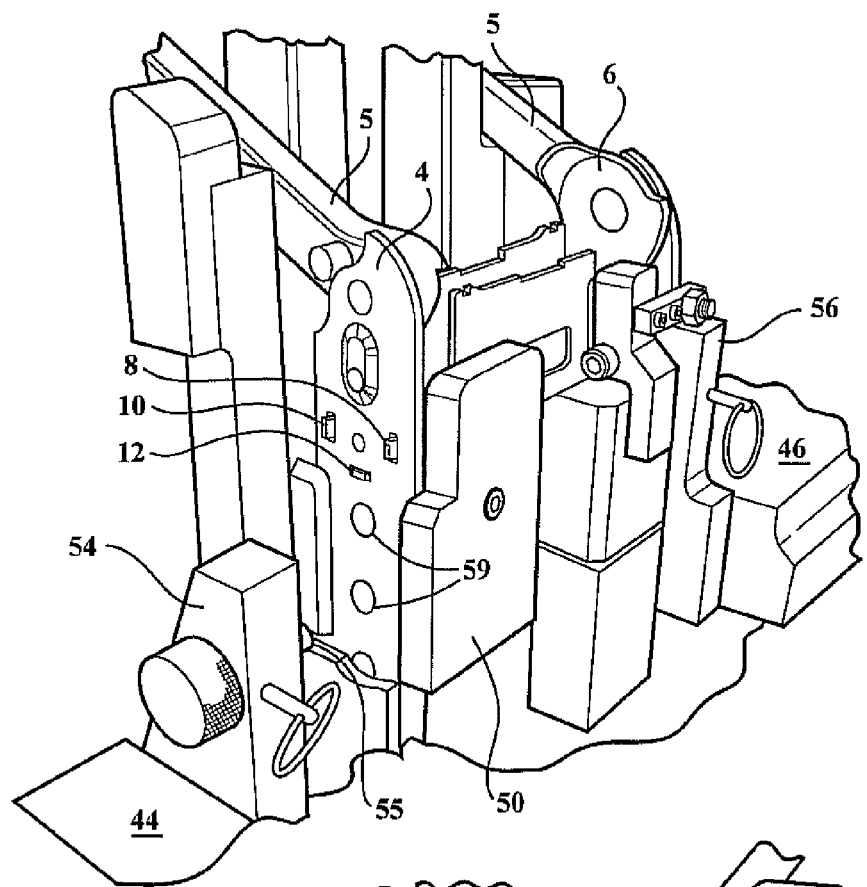
Figure 6:
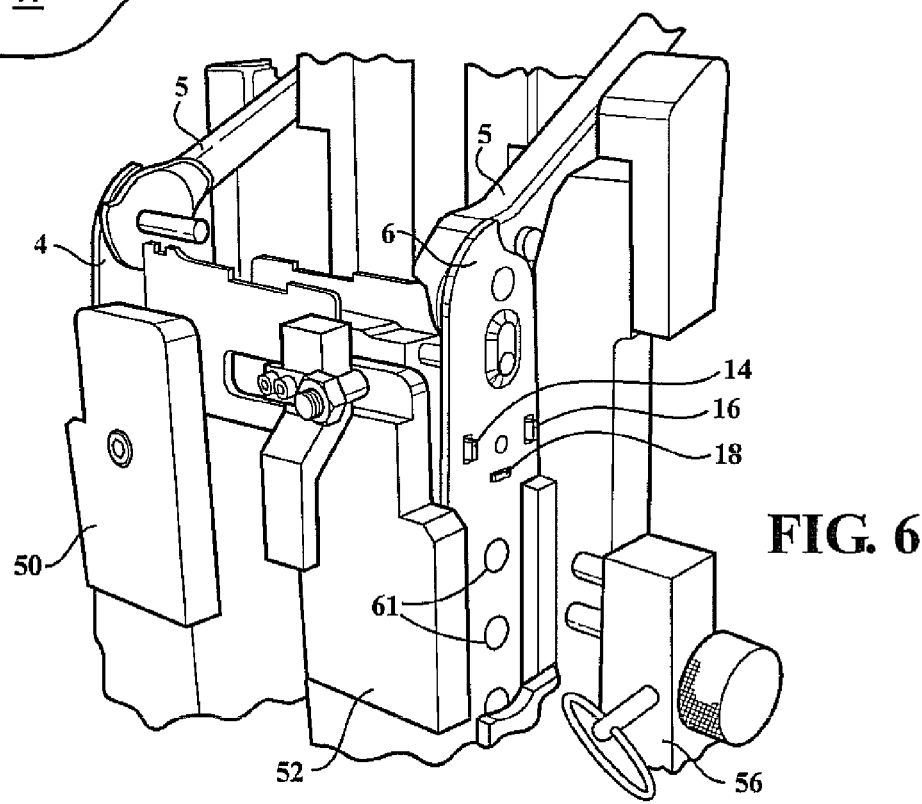
Figure 7:
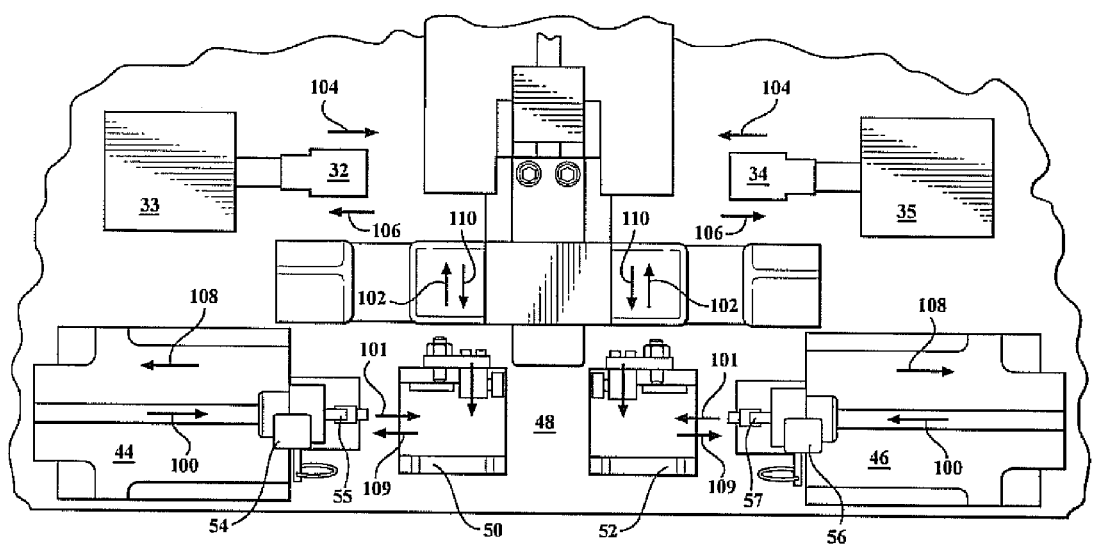
FIG. 7 is an overhead looking view of the jig and die assembly according to the invention and further referencing an actuating protocol for loading, swaging and removing a headrest.
Figure 8:
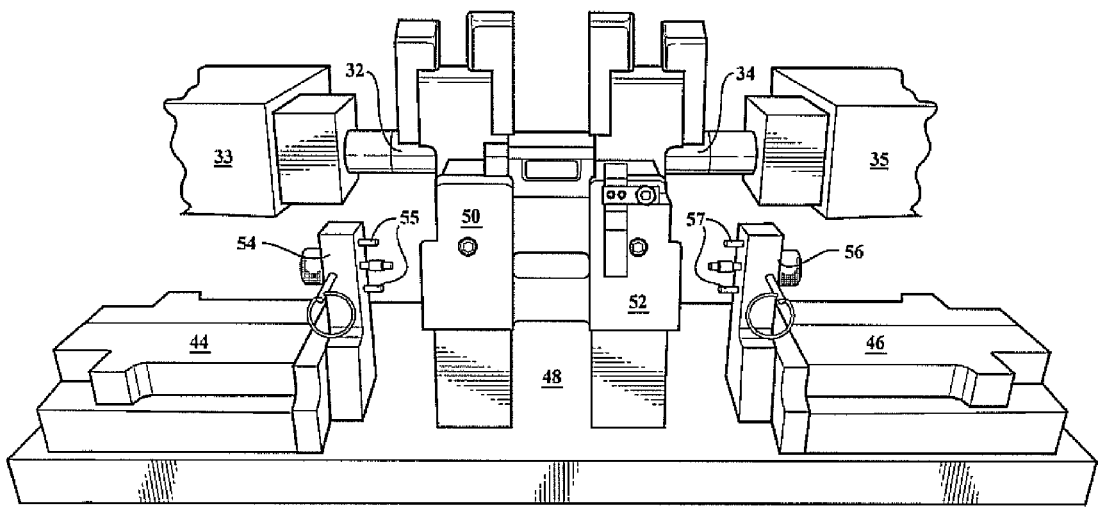
FIGS. 8-10 are a succession of front and first/second rotated side perspectives of the jig and die assembly, similar to those previously shown in FIG. 4-6, with the headrest workpiece removed, and which better depicts the configuration of the opposing and inwardly displaceable deforming dies for establishing the swaged configuration to the pluralities of opposite edge projecting portions of the housing in engaging fashion to the side support frames.

As previously indicated FIGS. 4-6 are a succession of front and first/second rotated side perspectives of a jig and die assembly supporting a headrest housing and side support frames during a swaging operation in which opposite side projecting portions of the housing are secured to each of the support frames. FIG. 7 is a succeeding and overhead looking view of the jig and die assembly according to the invention and further referencing an actuating protocol for loading, swaging and removing a headrest according to one non-limiting variant of the invention.

Figure 9:
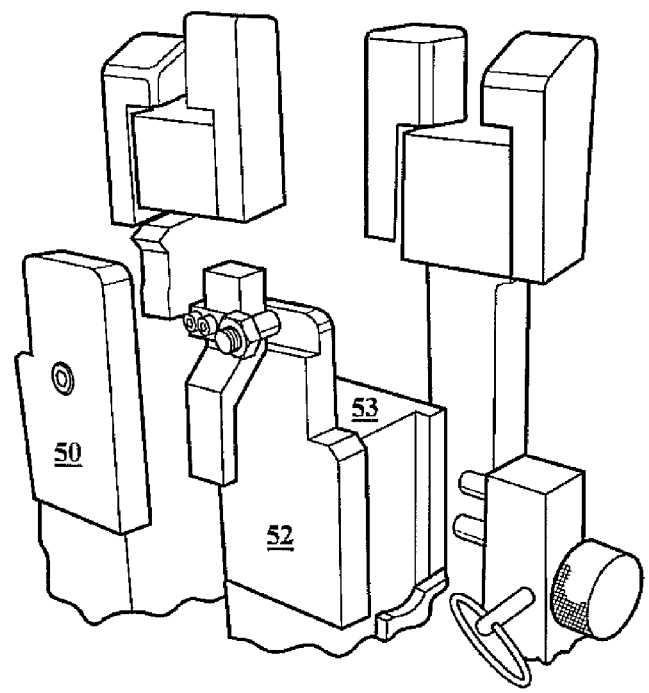
Figure 10:
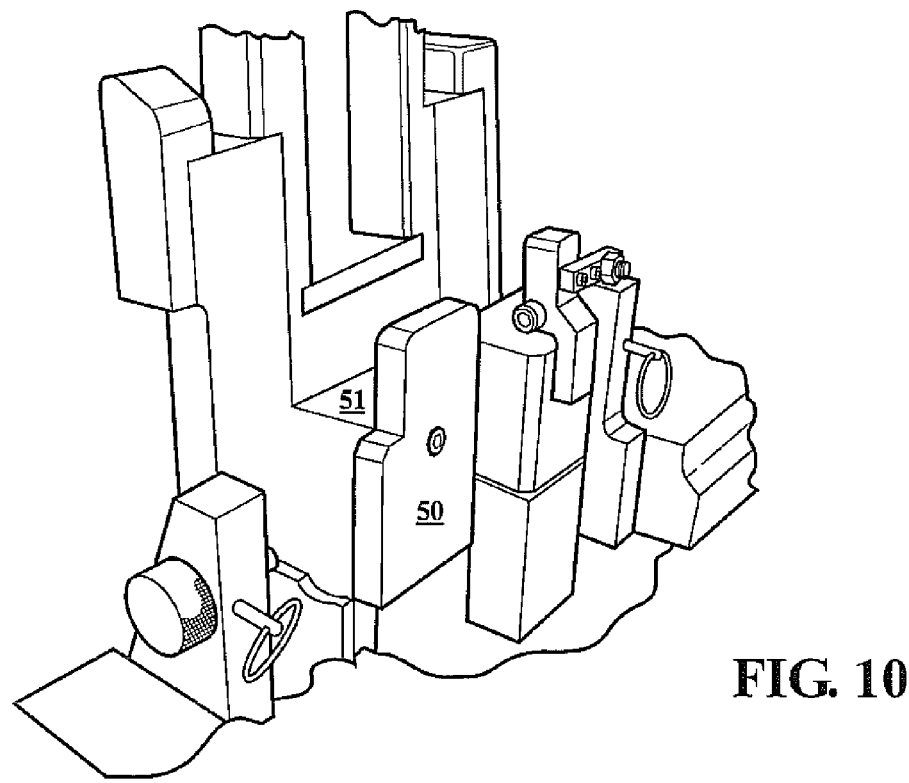

For purposes of ease of explanation, a series of number directional arrows ranging from 100 to 110 are shown in FIG. 7 and are intended to collectively depict an operational protocol for the loading, swaging and removing steps associated with the headrest jig assembly and method. That said, the jig assembly includes a first pair 44 and 46 of bi-directional traversable platforms, these being supported in each of inward (arrow 100) and outward (arrow 110) reciprocating fashion relative to a central support fixture (see additional platform 48 upon which are mounted headrest supporting structures 50 and 52 which are configured for supporting the headrest assembly depicted in FIGS. 1-3 to be swaged, as further shown in succeeding FIGS. 4-6. This is further depicted by headrest support surfaces 51 (for supporting structure 50) in FIG. 9 and further at 53 (for supporting structure 52) in FIG. 10.

Without further explanation, the platforms 44 and 46 can include an upper carriage supported and traversable portion which is driven in bi-directional fashion by such as a fixed fluid cylinder or other suitable electro-mechanical drive portion. A pair of engaging jigs 54 and 56 are mounted to inner opposing sides of the traversable platforms 44 and 46, each including a plurality of engaging fingers, see at 55 for jig 54 and further at 57 for jig 56, which seat within aligning aperture locations associated with the side frame plates 4 and 6 (see at 59 for side frame 4 in FIG. 5 and further at 61 for side fame 6 in FIG. 6) and so that, upon initially loading the headrest housing 2 and side frames 4 and 6 in an aligned and pre-swaged condition, the platforms 44 and 46 are inwardly displaced (again arrow 100 in FIG. 7) so that the jigs 54 and 56 seat through the frames 4 and 6 (depicted by additional indicated directional step 101 arrows).

In a succeeding actuation step, the central platform 48 is rearwardly displaced (such as by virtue of an additional servo or other two way cylinder actuating drive) in the direction of indicating arrows 102 so that the platforms 44 and 46 and securing jigs 54 and 56 are rearwardly displaced to a position underneath the opposing arrayed dies 32 and 34. At this point, the die end faces are aligned with the projecting patterns 8-12 and 14-18 depicted in FIGS. 1-3 and corresponding to the side frame aperture patterns 20-24 (side frame 4) and 26-30 (side frame 6). The dies are then inwardly actuated a modest distance relative to the other steps (see arrows 104) and in order to swage the opposite sets of projections 8-12 and 14-18 in the manner previously described, and so that the side frames 4 and 6 are firmly secured to the (opposite) edge profiles of the housing 2, this step taking advantage of the force multiplying aspects of exerting two highly compressive forces in a balanced manner for affixing the headrest components together.

During succeeding step (arrows 106), the dies 32 and 34 are retracted, following which the platforms 44 and 46 (arrows 108) and associated jigs 54 and 45 (arrows 109) are retracted while the central platform and structure supporting the headrest is still at its rearwardly displaced position. At this point, an overhead gripper (not shown) descends and removes the swaged headrest assembly from the jig supporting platform 48 and associated fixtures 50/52, which are then return actuated (or unloaded) as shown by arrows 110 a reverse distance and direction approximate to the prior loading depicted by arrows 102.

Without additional explanation or description, the jig assembly incorporates a known arrangement of pneumatic and/or hydraulic actuators, these utilizing a given architecture of hoses and fittings as depicted throughout the various views and in order to grip, load, swage and remove the headrest, following which the supporting jig structure is returned/reloaded. Beyond that illustrated, it is further envisioned that other and additional variants are contemplated, both in terms of the workpiece/headrest design as well as the jig assembly depicted and/or the protocol in which the various dies and platforms are actuated in order to load, align, swage, remove, return and reset the assembly in a repetitive fashion. It is also envisioned that the jig assembly and protocol according to the present invention can be utilized for swaging other articles/workpieces than the headrest assembly and without departing from the scope of the present assembly.

Having described my invention, additional preferred embodiments will become apparent to those skilled in the art to which it pertains and without deviating from the scope of the appended claims.

I claim:

1. A jig assembly for swage assembling a workpiece having first and second side components and a central component, said assembly comprising:

a first pair of bi-directional traversable platforms supported in inward and outward reciprocating fashion relative to a central support fixture upon which are mounted supporting structures for mounting the workpiece;

a pair of engaging jigs mounted to inner opposing sides of said pair of traversable platforms, each of said engaging jigs including a plurality of fingers which are adapted to seat within aperture locations associated with the workpiece side components and to facilitate loading and positioning the workpiece prior to swaging; and a pair of opposing and synchronized inward compressing dies for simultaneously swaging locations associated with opposite edges of the central component which project through apertures defined in the side components, each of said dies including an end face, said dies being subsequently retracted and the swaged workpiece removed.

2. The jig assembly as described in claim 1, each of said opposing dies further comprising an end face upon which are exhibited an array of projections including upper angling/bending locations and a lower notching location.

3. A method for swage assembling a workpiece having first and second side components and a central component, said method comprising the steps of:

positioning the workpiece upon a central supporting jig fixture and so that locations associated with opposite edges of the central component project through apertures defined in the side components;

inwardly traversing a pair of bi-directional platforms for gripping opposite sides of the workpiece;

providing a pair of engaging jigs mounted to inner opposing sides of said pair of traversable platforms, each of said engaging jigs including a plurality of fingers adapted to seat within aperture locations associated with the workpiece side components and to facilitate loading and positioning the workpiece prior to swaging;

rearwardly displacing the central jig fixture and supported workpiece in alignment with a pair of inwardly facing and opposing dies;

inwardly displacing said dies into compressive engagement with the projecting locations of the central component for simultaneously swaging to the side components; and retracting said dies and removing the swaged workpiece.

4. The method as described in claim 3, further comprising the step of forwardly displacing the central jig fixture following workpiece removal prior to loading with a subsequent pre-swaged workpiece.

5. The method as described in claim 3, said step of inwardly displacing said dies into compressive engagement further comprising the step of angling/bending upper locations and inwardly notching a lower location.

* * * * *